United States Patent [19]

Conrad et al.

[11] Patent Number: 4,595,359
[45] Date of Patent: Jun. 17, 1986

[54] APPARATUS FOR TREATING WORKPIECES IN A COMBUSTION CHAMBER

[75] Inventors: Hans-Jürgen Conrad, Rutesheim; Wolfgang Mauz, Leinfelden-Echterdingen; Walter Schildhorn, Fellbach, all of Fed. Rep. of Germany

[73] Assignee: Robert Bosch GmbH, Stuttgart, Fed. Rep. of Germany

[21] Appl. No.: 638,475

[22] PCT Filed: Dec. 24, 1983

[86] PCT No.: PCT/DE83/00219

§ 371 Date: Jul. 23, 1984

§ 102(e) Date: Jul. 23, 1984

[87] PCT Pub. No.: WO84/04266

PCT Pub. Date: Nov. 8, 1984

[30] Foreign Application Priority Data

Apr. 21, 1983 [DE] Fed. Rep. of Germany ....... 3314397

[51] Int. Cl.$^4$ .......................... F27B 5/04; C21B 7/04; F27D 1/00
[52] U.S. Cl. .................................... 432/205; 266/280; 432/247
[58] Field of Search ............... 266/280, 281, 282, 283, 266/286; 432/205, 231, 247

[56] References Cited

U.S. PATENT DOCUMENTS

| | | | |
|---|---|---|---|
| 2,336,366 | 12/1943 | Mudge | 266/280 |
| 3,329,759 | 7/1967 | Rice | 264/321 |
| 3,743,692 | 7/1973 | Vinton et al. | 65/32 |
| 3,992,138 | 11/1976 | Leisner | 432/231 |
| 4,394,007 | 7/1983 | Leisner | 266/249 |
| 4,487,576 | 12/1984 | Martini | 432/205 |

FOREIGN PATENT DOCUMENTS 556179  6/1974  U.S.S.R. .............................. 266/282

Primary Examiner—John J. Camby
Attorney, Agent, or Firm—Frishauf, Holtz, Goodman & Woodward

[57] ABSTRACT

In an apparatus for treating workpieces by means of the igniting of a gaseous mixture in a work chamber for receiving the workpiece, it is proposed that the work chamber and optionally the supply duct for the gaseous mixture, as well as a mixing block for preparing the gaseous mixture which precedes the supply duct, are provided at least in part with a lining of ceramic material in the form of aluminum oxide or zirconium dioxide, in order to intercept the corrosive action exerted by the ignition of the combustion gas-oxygen mixture upon these parts of the apparatus.

12 Claims, 6 Drawing Figures

APPARATUS FOR TREATING WORKPIECES IN A COMBUSTION CHAMBER

The present invention relates to a thermal deburring apparatus.

BACKGROUND

In known machines for thermal deburring particularly referred to, a chemical process takes place under the influence of heat. In thermal deburring, the material to be removed is oxidized, or combusted, with oxygen. The heat shock necessary for deburring is generated by the combustion of a mixture of combustion gas and oxygen; hydrogen or natural gas, such as methane, may be used as the combustion gas. In order to be able to liberate the necessary energy, the gas mixture must be compressed before being ignited. This is generally accomplished with the aid of metering cylinders and gas injection cylinders. In known systems, the mixing and ignition of the combustion gas and oxygen mixture is effected in a separate mixing block.

Such known mixing apparatus comprise a housing, in which the mixing chamber and igniting device are located. This mixing chamber is connected via a relatively long duct with the work chamber, the duct serving to protect the valves disposed between the mixing block and the metering device when the highly compressed gas ignites. The combustion temperature of the gas is in the range from 2500° to 3500° C. The pressures of the combustion gas and oxygen mixture occurring in the work chamber are on the order of up to 60 bar when the work chamber is filled.

In known systems for thermal deburring, the workpiece that is to be trimmed is placed upon a closing plate, which is then driven upward from below against the cylindrical deburring chamber, so as to form with the deburring chamber a work chamber that is sealed against high pressures and temperatures.

In another form of embodiment according to German published patent application DE-OS No. 32 04 995 (to which U.S. Pat. No. 4,487,576 corresponds), the necessity for a mixing block is avoided by providing that the wall surrounding the work chamber is an inner chamber wall, surrounded by an outer chamber wall that is axially slidable relative to it; during the process of filling the work chamber with gas, the work chamber is closable by means of the outer chamber wall, while during the ignition process it is closable by means of the inner chamber wall. The inner chamber wall may have bores for delivering both the combustion gas and the oxygen, which flows into the work chamber when the outer chamber wall is closed relative to the closing plate, before the inner chamber wall is closed. The ignition of the mixture of combustion gas and oxygen then takes place in the work chamber. This construction is intended to counteract the corrosive effect of the combustion gas and oxygen mixture on the delivery means of the mixture when it is ignited; however, it represents an additional expense.

As noted above, the known apparatus have the disadvantage that the mixture of combustion gas and oxygen, when it ignites, not only causes the deburring of the workpieces being trimmed, but also has a corrosive effect upon the parts with which it comes into contact either during ignition or during the trimming operation. In both instances mentioned above, this applies to the inner wall of the work chamber, and in the case of an apparatus having a mixing block and a supply duct, it applies to both the supply duct and that part of the mixing block into which the ignition process extends. The supply duct is particularly imperiled because it is curved or bent at an angle at at least one point. Countermeasures against this corrosive effect are therefore in order for the apparatus of the type discussed above.

THE INVENTION

Briefly, the structure which defines a work chamber is formed with a lining of high temperature resistant ceramic material. In accordance with a feature of the invention, at least some of the walls of the chamber, namely the wall exposed to the mixture being ignited are so lined, so that deterioration of the wall portions due to the corrosive effect of high temperature and gases, which may result in scaling of the walls, is effectively prevented.

The apparatus according to the invention has the advantage over the prior art that expensive wearing parts subject to corrosion from the ignition of the combustion gas and oxygen mixture are replaced by more-resistant materials, so that a considerably longer service life is attained for these parts. The opportunity is also afforded of removing and replacing the inserts according to the invention, which are relatively simple structural components, without substantially affecting the design of the apparatus.

The lining of ceramic material according to the invention can be sprayed on at the designated locations, in particular on the inner wall of the work chamber, and it is appropriate to provide a slight relieving of the surface of the contour at the locations designated for the spray application (the contour being known per se), so that the sprayed-on ceramic material will hold securely and positively.

The lining according to the invention may also comprise inserted ceramic parts, however, which are suitably shrunk into the armoring embodied by the work chamber or mixing block. These inserted parts can be prefabricated in the appropriate shape, and after being shrunk in, secure holding is attained even at the temperatures which occur, because the ceramic materials mentioned are very close in terms of their coefficient of expansion to that of the material, such as chrome steel, of which the apparatus is made as a rule.

The ceramic parts may be held in their receptacle in the work chamber or mixing block by means of pre-inserted parts joined to the work chamber or mixing block; these pre-inserted parts may be held by positive engagement or may be joined by welding to the work chamber or mixing block.

The apparatus according to the invention is naturally not restricted to a system for thermal deburring of workpieces, because a system of this kind has numerous possible applications. For instance, the "reticulation of foamed material" according to German Pat. No. 1 504 096 or the "method for the removal of cohering porous molds" according to German Pat. No. 2 322 760 can be performed with the apparatus herein. The criterion is a machining or trimming operation performed on a workpiece by means of an explosive gas mixture in a closed chamber.

DRAWING

Further characteristics and details of the invention will become apparent from the ensuing description of forms of embodiment shown in the drawing. Shown in the drawing are:

FIG. 1, the schematic structure of a known deburring apparatus;

FIG. 2, the essential features of the deburring apparatus of FIG. 1 in accordance with a first form of embodiment according to the invention;

FIG. 3, the essential features of the deburring apparatus of FIG. 1 in accordance with a second form of embodiment according to the invention;

FIG. 4, the mixing block of FIG. 3, in two sectional views rotated about an angle of 90°;

FIG. 5, the work chamber of a deburring apparatus in accordance with a further form of embodiment of the invention; and FIG. 6, the work chamber according to FIG. 5, in a modified construction.

DETAILED DESCRIPTION

Figure 1:
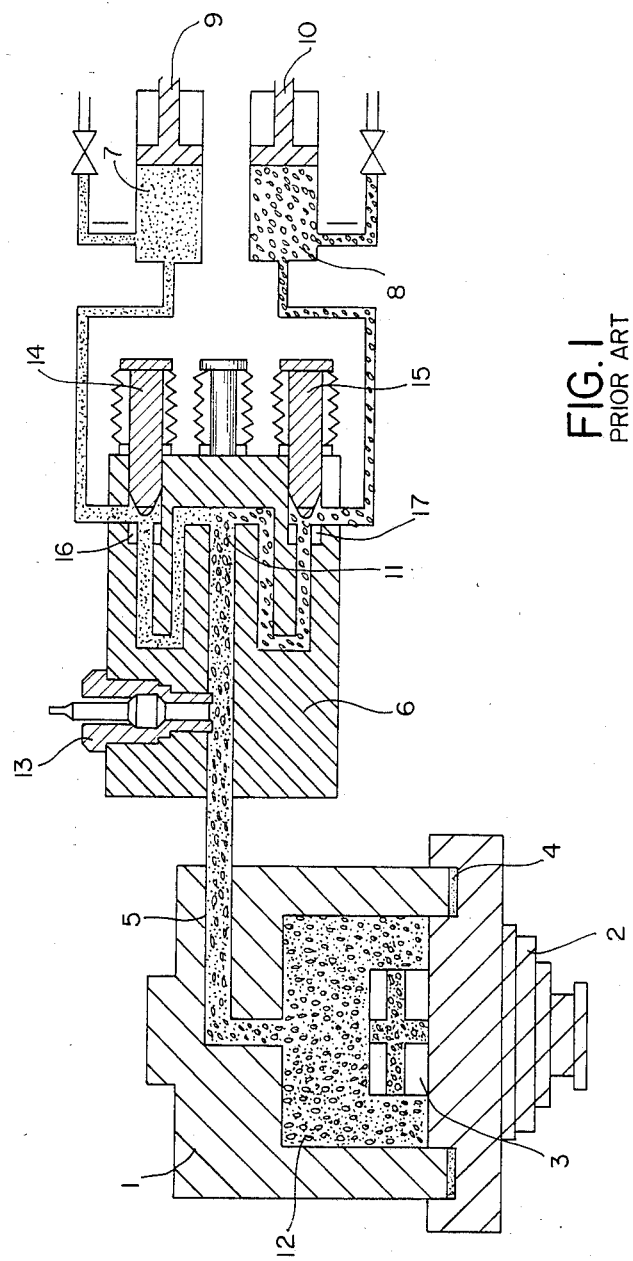

As shown in FIG. 1, an apparatus for deburring workpieces substantially comprises a work chamber structure 1, which is supported by a machine frame, not shown. The work chamber is closable from below for the deburring operation by a closing plate 2, which after a workpiece 3 has been placed on it is raised from below toward the work chamber 1 and joined to it in a pressure- and temperature-tight manner via a seal 4. The closing plate 2 can be raised and lowered hydraulically or mechanically on the machine frame, not shown.

Adjoining the work chamber 1 via a supply duct 5 is a mixing block 6, to which combustion gas 7 and oxygen 8 are supplied via respective metering and gas injection cylinders 9 and 10. The mixture of combustion gas and oxygen is effected at location 11 and then reaches the combustion chamber 12 via the duct 5.

For the ignition operation, which is triggered by the spark plug 13, the communication between the cylinders 9, 10 on the one hand and the mixing block 6 on the other is interrupted by the closure of valves 14 and 15, which may be actuated hydraulically in a manner not shown and are closed by being seated on valve rings 16 and 17.

With the combustion gas-oxygen mixture now ignited by means of the spark plug 13, the deburring of the workpiece is accomplished. This operation takes place in an extremely short time, during which only the material to be removed is overheated and thus burned off, while the remaining parts are merely heated to within tolerable limits.

After this operation is ended, the closing plate is lowered, and the trimmed workpiece is replaced with a workpiece that is to be trimmed, whereupon the process is repeated in the manner described.

Although the parts belonging to the apparatus are heated only within tolerable limits by the igniting of the combustion gas and oxygen mixture, the combustion of this mixture does have a corrosive effect over the course of time on the surfaces of the apparatus that are in contact with the mixture during its ignition, so these surfaces undergo a certain amount of wear which from time to time necessitates replacement of the parts having these surfaces. These parts are essentially the work chamber 1 and the mixing block 6, inside which the burnoff process can extend as far as the valve rings 16, 17.

Figure 2:
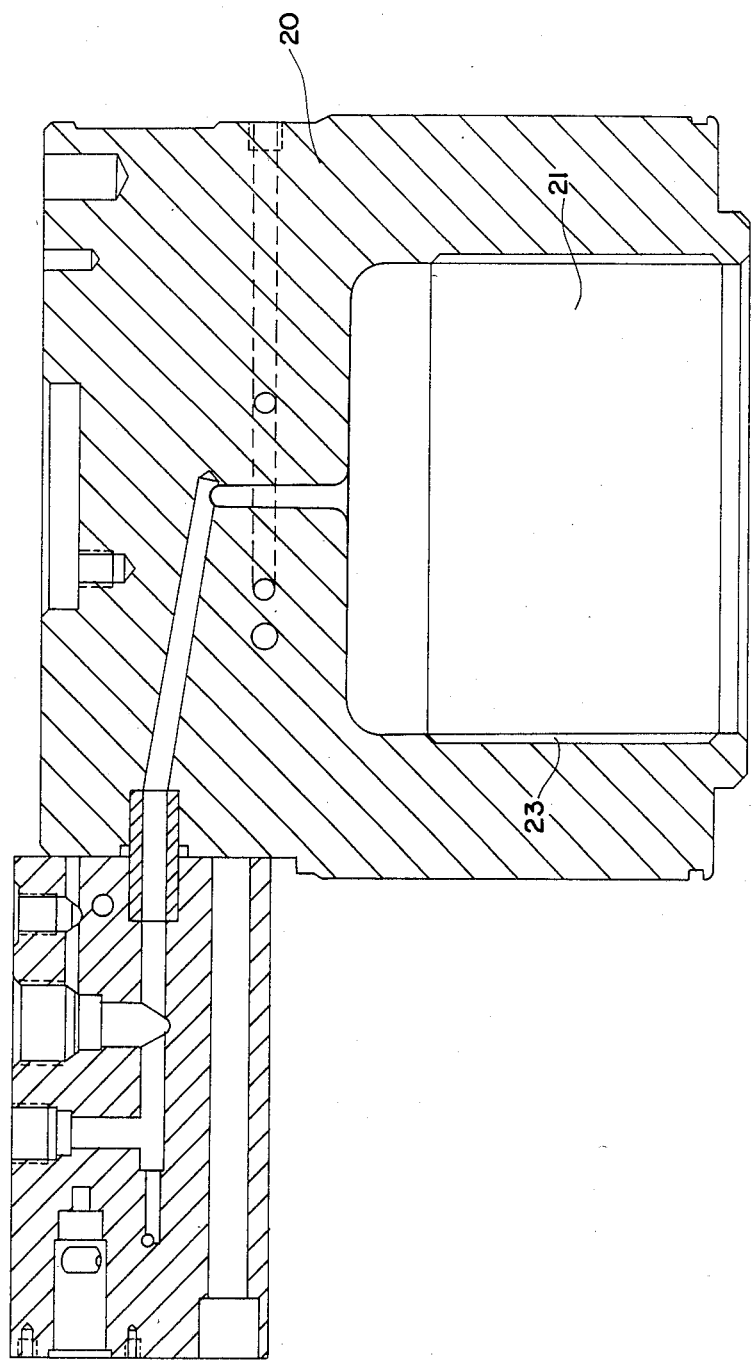

In accordance with a feature of the invention, and as shown in greater detail in FIG. 2 the cylindrical inner wall of the work chamber structure 20 is lined with a jacket 21 of ceramic material, in the form of aluminum oxide or zirconium dioxide. In the instance illustrated here, the lining 21 is sprayed on, and the inner wall of the work chamber 20 has a slight relief or setback 23 in the radial direction to enable the sprayed-on ceramic material to make a positive connection with the work chamber structure 20.

Figure 3:
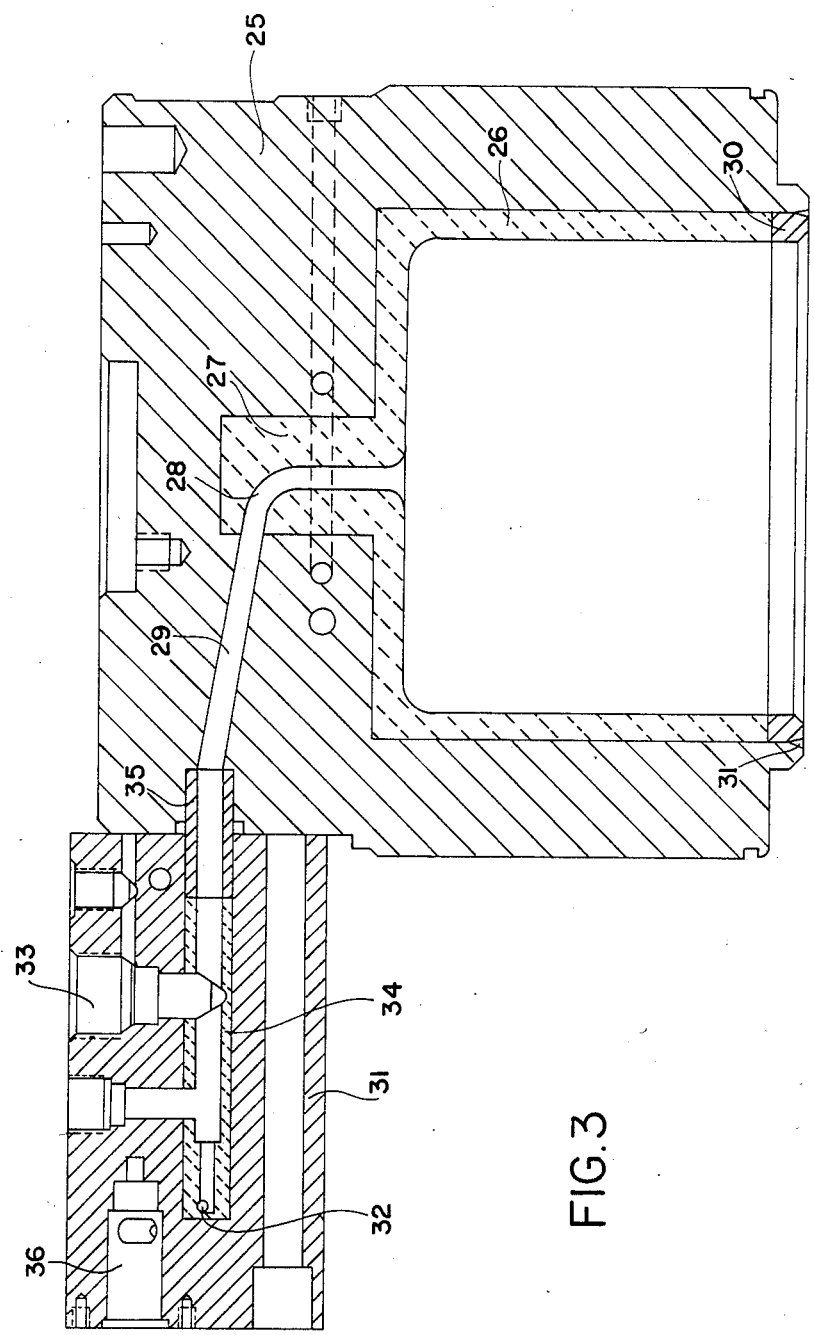

In accordance with a further example shown in FIG. 3, which is structurally very similar to the embodiment of FIG. 2, an insert 26 is shrunk into the work chamber structure 25, protruding with an extension 27 into the top of the work chamber structure 25 as well, so as to encompass there a diversion point 28 of the supply duct 29 which is particularly vulnerable to corrosion. The insert 26 is otherwise held toward the bottom by a ring 30, which is welded at 31 to the material of the work chamber structure 25 and together with the work chamber structure forms the seating location for the seal, shown at reference numeral 4 in FIG. 1, between it and the closing plate.

FIG. 3 also shows the mixing block 31, in which the mixing of the combustion gas and oxygen mixture takes place at 32, from whence the mixture flows along the spark plug, only the receptacle bore 33 of which is shown here, to the supply duct 29. An insert 34 of ceramic material is located in the bore of the mixing block and is positively held between the work chamber structure 25 and the mixing block by a connecting strut 35. One of the bores in which the valves 14, 15 of FIG. 1 are displaceable is visible at 36.

In the embodiment of FIG. 3, the inserts 26, 27 or 34 can be removed and replaced. For the insert 34 of ceramic material, this is accomplished by simply removing the part, while for the removal of the insert 26, 27, the ring 30 must be loosened and the shrinking-in of this insert must be reversed by heating the work chamber structure 25, whereupon a new insert 26, 27 can then be shrunk in, or a new insert 34 can be inserted into the mixing block 31.

Figure 4:
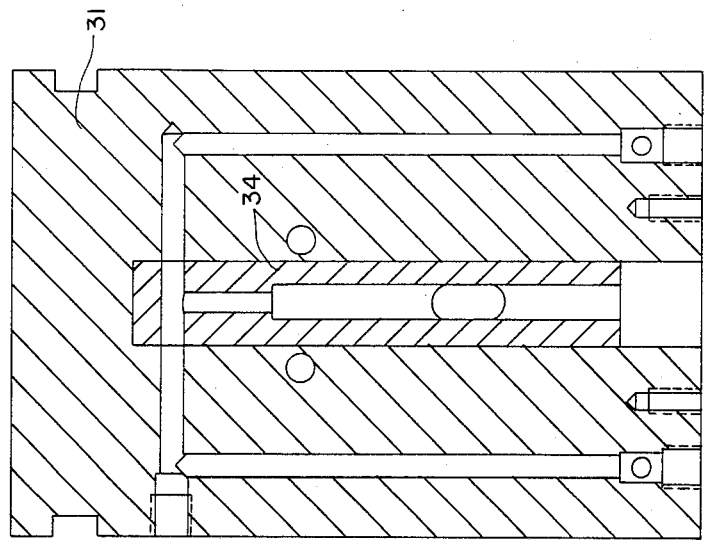
Figure 4:
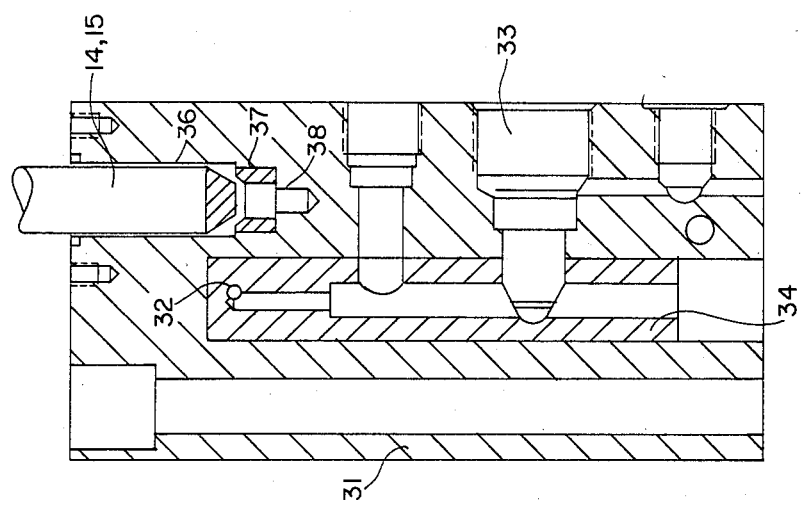

The mixing block 31 is shown once again, in greater detail, in two sectional views in FIG. 4. Here the insert 34 of ceramic material is again visible. Also shown in greater detail here is the bore 36 for one of the valves 14, 15 of FIG. 1, and it is shown here that the valve rings 37, which correspond to the valve rings 16, 17 of FIG. 1, may likewise be of ceramic material, because here again corrosion must be taken into account when the combustion gas and oxygen mixture is ignited. The valve rings 37, as interchangeable parts, may also be merely inserted into the bore section that embodies their seat and placed against the stop face 38.

Figure 5:
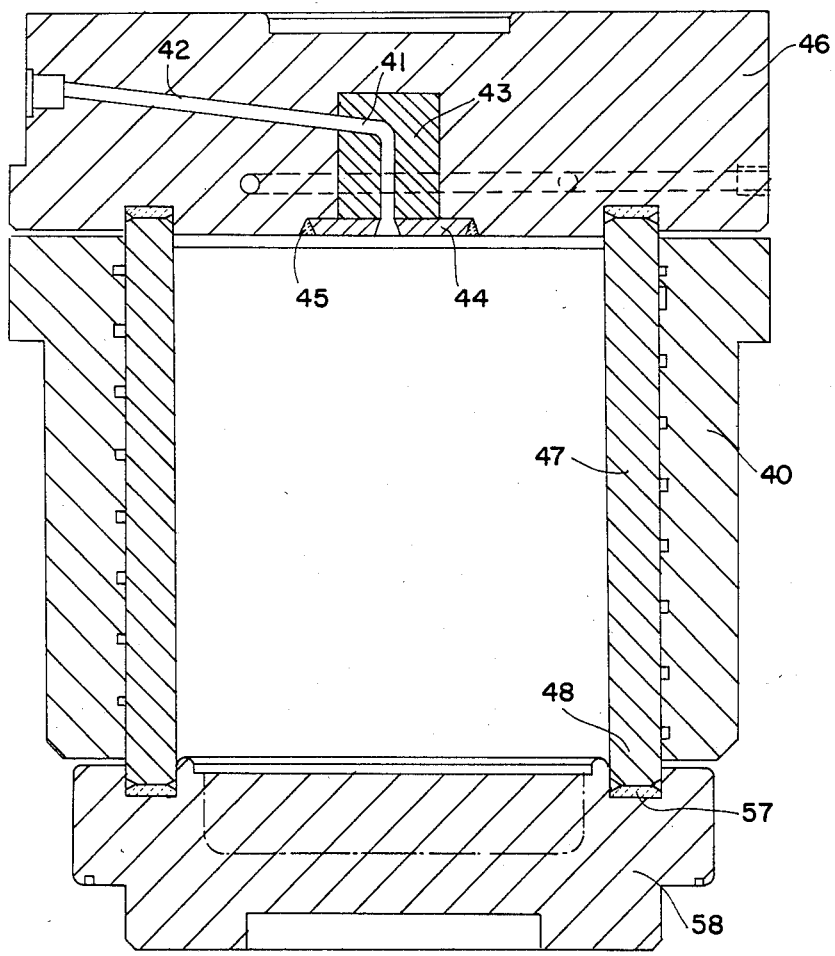

FIG. 5 shows only a work chamber 40, in which the bend 41 of the supply duct 42 for the combustion gas-oxygen mixture is armored or protected by an insert 43 of ceramic material. The insert 43 is held in place by a pre-inserted part 44, which is welded at 45 to the top 46 of the work chamber 40. FIG. 5 also shows the example of a so-called divided combustion chamber, the top 46 of which is a separate component which is firmly clamped to the cylindrical jacket in some manner, for instance by means of axially parallel screws, but can be loosened from the jacket in order to facilitate the replacement of the insert 43 by loosening the part 44.

Figure 6:
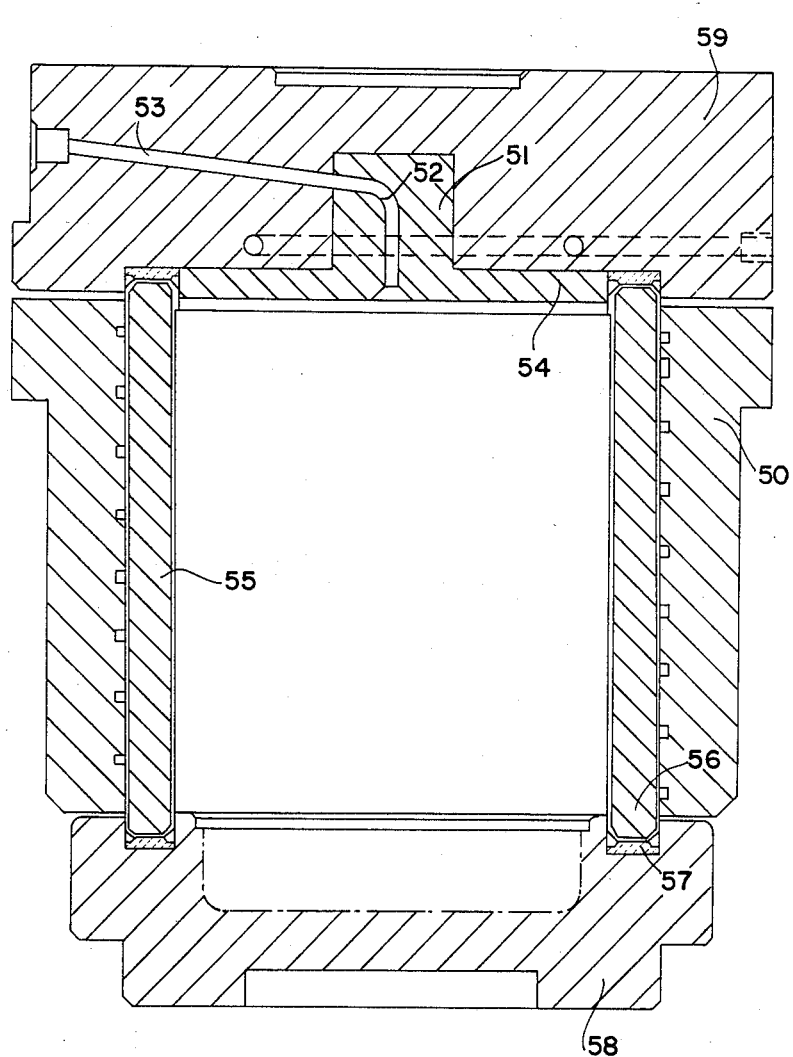

FIG. 6 shows a work chamber 50, which in terms of its basic structure agrees with the work chamber of FIG. 5. However, in its top part 59 an insert 51 is shrunk into place, encompassing both the bend 52 of the supply duct 53 for the combustion gas and oxygen mixture and the upper horizontal surface of the combustion chamber.

The cylindrical jacket part of the work chambers 40, 50 is provided with a sheath-like lining 47 and 55, respectively, which here again is shrunk into place and at the same time also forms the protruding collar 48 and 56 at the bottom, which is brought into sealing engagement with the seat 57 facing the closing plate 58.

Since in the exemplary embodiments as they have been described with reference to FIGS. 2-6 essential parts which come into contact with the combustion gas-oxygen mixture when it is ignited are lined with ceramic material, these parts are prevented from being able to corrode in the vicinity of the lining, so that no impairment of the apparatus for thermal deburring can occur in that respect. The ceramic parts are generally embodied as inserts, which can be interchangeably removed and replaced without otherwise impairing the apparatus.

We claim:

1. Apparatus for treating workpiece by means of pressure and temperature pulses by ignition of a gaseous mixture, particulary thermal deburring apparatus having means defining a work chamber;
    a closing plate means for closing the chamber,
    the chamber being adapted to receive the workpieces,
    supply duct means passing through the top part of the work chamber opposite the closing plate and discharging into the work chamber; and
    means for mixing and igniting a mixture of combustion gas and oxygen in the chamber,
    characterized by
    a lining (21; 26, 27; 34; 43; 51, 55) of high temperature resistant ceramic material on at least some of the walls of the chamber exposed to the mixture of combustion gas and oxygen upon ignition thereof.

2. Apparatus according to claim 1, wherein the ceramic material comprises aluminum oxide or zirconium oxide.

3. Apparatus according to claim 1, wherein the lining (21) comprises sprayed-on ceramic material.

4. Apparatus according to claim 1, wherein the lining (26, 27; 34; 43; 47; 51, 55) comprises inserted ceramic elements.

5. Apparatus according to claim 4, wherein the inserted ceramic elements are shrink-fitted into the means defining the work chamber.

6. Apparatus according to claim 4, including insert holding elements (30, 35, 44) secured to the means defining the work chamber (25, 40) and holding in place and against inner walls of the work chamber the ceramic elements (26, 27; 34; 43), said ceramic elements being in plate or block form.

7. Apparatus according to claim 1, further including a mixing block for mixing the combustion gas and oxygen and means joining the mixing block to the work chamber;
    and wherein said mixing block and joining means are internally lined with said lining of high temperature ceramic material.

8. Apparatus according to claim 7, wherein the lining (21) comprises sprayed-on ceramic material.

9. Apparatus according to claim 7, wherein the lining (26, 26; 34; 43; 47; 51, 55) comprises inserted ceramic elements.

10. Apparatus according to claim 7, wherein the inserted ceramic elements are shrink-fitted into the means defining the work chamber.

11. Apparatus according to claim 7, including insert holding elements (30, 35, 44) secured to the means defining the work chamber (25, 40) and holding in place and against inner walls of the work chamber the ceramic elements (26, 27; 34; 43), said ceramic elements being in plate or block form.

12. Apparatus according to claim 7, wherein the ceramic material comprises aluminum oxide or zirconium oxide.

* * * * *